Jan. 19, 1954  B. PUTTERMAN  2,666,611
AUTOMOBILE MIRROR ATTACHING BRACKET
Filed April 18, 1950
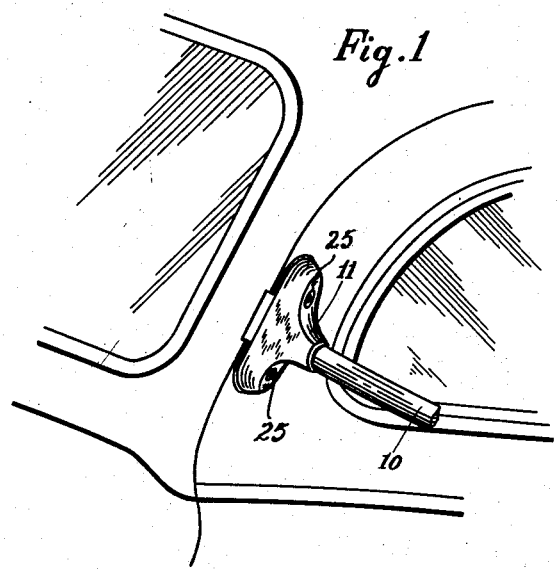
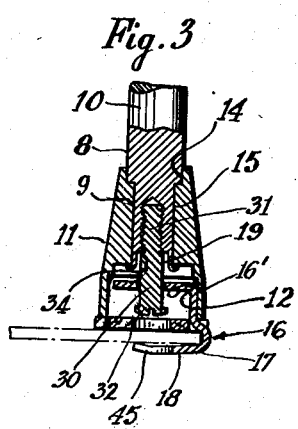
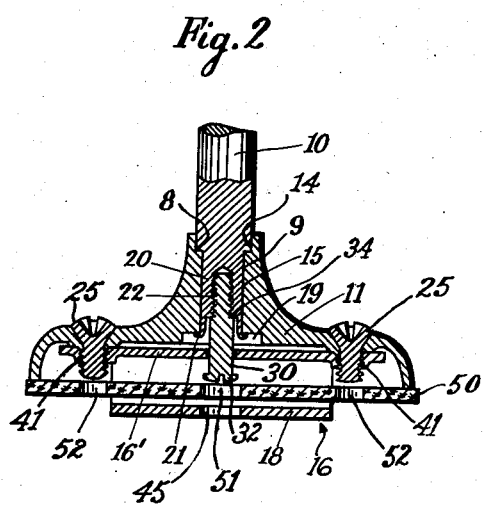
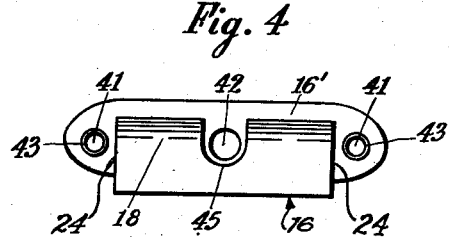
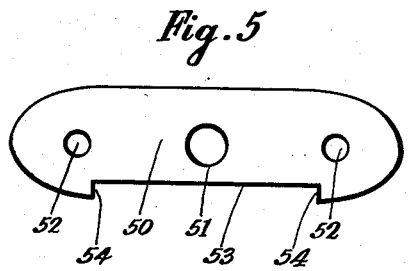
INVENTOR.
BENJAMIN PUTTERMAN
BY
ATTORNEY.

Patented Jan. 19, 1954

2,666,611

UNITED STATES PATENT OFFICE 2,666,611

AUTOMOBILE MIRROR ATTACHING BRACKET

Benjamin Putterman, Fairfield County, Conn., assignor to Yankee Metal Products Corporation, Norwalk, Conn., a corporation of New York Application April 18, 1950, Serial No. 156,649

2 Claims. (Cl. 248—226)

This invention relates to automobile accessories, and more particularly, to the type which is disposed exteriorly of the car and is secured to the flange of the car door, as, for example, rear-view mirrors. The invention is directed to means for clamping such accessories to the door flange.

The principal object of the invention is to provide a clamping means which will be absolutely theft-proof. In accessory clamping devices as heretofore made, it has been possible to unscrew or otherwise remove the supporting bracket arm from the clamping device, even though the latter itself was made unremovable by reason of the closed door and locked car. In said devices, removal of the bracket supporting arm leaves the clamping device secured to the car; but it should be noted that the clamping device is the least expensive part—the accessory itself is removed with the bracket supporting arm.

A further object of the invention is to provide an absolutely theft-proof clamping means, as described, which will comprise relatively few parts, which parts are suited for low-cost production, and which can be installed with ease and which will remain firmly in place.

For the attainment of the foregoing and such other objects of invention as may appear or be pointed out, I have shown a preferred embodiment of my invention in the accompanying drawings, wherein:

Fig. 1 is a perspective view of the front corner of an automobile showing the improved clamping means in place;

Fig. 2 is a sectional view through the improved clamping means, the section being taken on a plane through the long axes of the clamping means;

Fig. 3 is also a sectional view but taken on a plane disposed normally to the section plane of Fig. 2;

Fig. 4 is a top view of the channel member; and

Fig. 5 is a top view of the gasket.

The improved clamping means comprises essentially but three members, viz., the bracket supporting arm 10, the housing 11, and the U-shaped or channel member 16. The bracket supporting arm 10 is secured to the housing 11 in a manner to make the two unseparable.

The housing 11 has a central bore 15 enlarged at both ends, namely, the enlargement 14 at the neck of the housing, and the enlargement 19 where the bore 15 enters the hollow of the housing. The supporting arm 10 is reduced at 9 to provide a shoulder 8 which fits in bore enlargement 14, the reduced portion 9 of the arm passing through bore 15 of the housing. The extreme end of reduced portion 9 of the arm extends beyond the central bore 15 and is hollowed to provide a thin annular wall, which is then peened over, as indicated at 21. The peened-over portion 21 is received with the lower enlargement 19 and hence does not protrude into the hollow of the housing.

The integrally united bracket arm 10 and housing 11 are placed exteriorly of the car door, as best shown in Fig. 3. As then shown, a thin gasket 50 of rubber, fibre or other suitable material, is interposed between the edge of housing 11 and the outer surface of the door flange (shown in broken lines in Fig. 3). The third member, the aforesaid channel member 16, straddles the door flange; more particularly, the channel member 16 has a main plate, designated 16' which forms the inner leg of the channel member 16, and a lip 18 which forms the outer clamping leg of the channel. As best shown in Fig. 4, the channel plate 16' is somewhat larger than lip 18. The channel is disposed, see Fig. 3 and also Fig. 2, with the plate 16' within the housing 11, i. e., on the outer side of the door flange, and with its lip 18 on the other or inner side of the door flange.

Plate 16' of the channel member has a central aperture 42 through which is passed a screw element 30, the head 32 of which is too large to pass through aperture 42. Screw element 30 has a reduced threaded end portion 31 (Fig. 3) which is screwed into a tapped hole 22 (Fig. 2) in the reduced portion 9 of the bracket arm 20. A definite shoulder 34, see Fig. 3, is formed by said reduced threaded portion 31 so that a positive stop is provided for the screw element 30, with its enlarged head 32 spaced a predetermined distance from the inner wall of housing 11. By reason of this spacing away of the head 32, channel member 16, more particularly, its plate 16', has an extent of movement between the enlarged head 32 and the inner wall of the housing. This movement is provided to accommodate the clamping means to various thicknesses of car door flanges. This accommodation is achieved by two screws 25, 25, Fig. 2, which pass through holes 41, 41 provided in the housing 11. The screws (25) have countersunk or flat heads and the holes (41) are likewise countersunk to receive the screws with the top surface of the screws flush with the surface of the housing, see Fig. 2. The screws 25, 25 are threaded into tapped holes 41, 41, provided in the plate 16' of the channel member, see Fig. 4. The holes 41, 41 are slightly flanged downwardly, see 43, 43, Fig. 4, to provide sufficient thread surface, see Fig. 2.

Referring to Fig. 3, it will be seen that the web of the channel member connecting its inside plate 16' and its outside lip 18 is configured to present a longitudinal groove 17 in which the edge of the door flange (shown in dot-and-dash lines) is received. It will also be seen that the tip end of lip 18 is inclined downwardly to present an edge thereof in contact with the door flange (rather than the entire flat surface of the lip).

With further reference to Fig. 3, it will be seen that one of the sides of the housing 11—more particularly, the right side in said figure—is recessed at 12 to receive a part of the channel web.

As shown in Fig. 4, the channel plate 16' is configured to fit within the housing 11. The gasket member 50, Fig. 5, likewise has the configuration of the housing, but is larger than the plate 16' and the housing so that the edges of the housing rest on the gasket, see Figs. 2, 3. One edge of gasket 50 has a central recessed portion 53 limited by shoulders 54, 54. The dimension 53 is somewhat greater than the length of channel lip 18 so that the gasket may be readily located by placing it against the open end of housing 11 with the lip projection 18 recessed in the gasket recess 53, 54, more particularly with the shoulders 54, 54 of the gasket abutting the ends 24, 24 of the lip projection, see Fig. 4.

The lip 18 has a centrally disposed edge recess 45, see Fig. 4, to make the head 32 of the screw element 30 accessible, see also Fig. 2. The gasket 50 may have a central aperture 51 which, when the gasket is positioned as described, is aligned with the screw element 30, and with a pair of end apertures 52, 52 which are aligned with the screws 25, 25.

The improved clamping means is positioned on the door flange, as explained (see Figs. 2, 3), and is secured firmly thereto by the screws 25, 25 which are exposed on the housing, see Fig. 1. It will be noted that, with the car door locked, the accessory and its improved clamping means cannot be removed, although it can be loosened by means of the exposed screws 25, 25. And it is important to note that the bracket supporting arm 10 cannot be unfastened because of its integral union (21, Fig. 2) with the housing. Nor can the housing 11 be removed because of the enlarged head 32 of the screw element 30.

I claim:

1. A device for attaching an automobile accessory to the flange of a car door, said device comprising a bracket supporting arm, a housing and a U-shaped channel member receivable therewithin and comprised of an inner leg and an outer clamping leg, means for adjusting said channel member toward and away from the housing, a tapped opening centrally of said arm and open to the housing and a theft preventing member freely receivable through an opening provided in the inner leg and having one end threaded for engagement in said tapped opening, an enlarged head at its other end to prevent disconnection of the channel member from the housing when the threaded end of said member is engaged into said tapped opening and having an intermediate section of such length that when the threaded end is passed through the opening in the inner leg of the channel member and engaged to its limit in the tapped opening, the enlarged head will be positioned fixedly in the space between the legs for a distance beyond the innermost face of the housing to permit the adjusting means to move the channel member through a range relatively to said fixedly positioned theft preventing member, to effect attachment and detachment of the channel member from the car door flange.

2. A device as set forth in claim 1 wherein the inner leg of the channel member is extended at one end laterally beyond the corresponding end of said clamping leg and the channel member adjusting means comprises registerable openings in said housing and inner channel member leg for the reception of an adjusting element threadedly engaged in one of said registerable openings.

BENJAMIN PUTTERMAN.

References Cited in the file of this patent

UNITED STATES PATENTS

| Number | Name | Date |
| --- | --- | --- |
| 2,282,746 | Putterman | May 12, 1942 |
| 2,299,280 | Reed | Oct. 20, 1942 |
| 2,322,431 | Fischer | June 22, 1943 |
| 2,322,798 | Fischer | June 29, 1943 |
| 2,336,805 | Reed | Dec. 14, 1943 |